United States Patent [19]

DeJarnette, Jr.

[11] Patent Number: 5,218,829
[45] Date of Patent: Jun. 15, 1993

[54] FLEXIBLE HYDROSTATIC COOLING TOWER FOR CONTINUOUS COOKER

[75] Inventor: Edward A. DeJarnette, Jr., Turnersville, N.J.

[73] Assignee: Campbell Soup Company, Camden, N.J.

[21] Appl. No.: 848,175

[22] Filed: Mar. 10, 1992

[51] Int. Cl.$^5$ .............................................. F25D 13/06
[52] U.S. Cl. ............................................ 62/63; 62/375
[58] Field of Search ..................... 62/63, 64, 60, 374, 62/375

[56] References Cited

U.S. PATENT DOCUMENTS

| | | | |
|---|---|---|---|
| 1,082,743 | 12/1913 | Gettelman . | |
| 1,577,219 | 3/1926 | Fooks . | |
| 1,987,414 | 1/1935 | Omsted | 126/272 |
| 2,025,990 | 12/1935 | Kokemper | 126/272 |
| 3,252,405 | 5/1966 | Mencacci | 99/362 |
| 3,286,619 | 11/1966 | Lee | 99/362 |
| 3,407,721 | 10/1968 | Carvallo | 99/249 |
| 3,545,985 | 12/1970 | Mencacci et al. | 99/214 |
| 3,615,725 | 10/1971 | van der Winden | 99/214 |
| 3,619,126 | 11/1971 | Carvallo | 21/56 |
| 3,986,832 | 10/1976 | Smorenburg | 21/80 |
| 4,157,061 | 6/1979 | Margus, Jr. | 99/352 |
| 4,304,105 | 12/1981 | West | 62/375 |
| 4,604,948 | 8/1986 | Goldhahn | 99/470 |
| 4,636,366 | 1/1987 | Langen | 422/297 |

FOREIGN PATENT DOCUMENTS

438885A1 7/1991 European Pat. Off. .
1173333 12/1969 United Kingdom .

OTHER PUBLICATIONS

Stork "Hydromatic" Automatic Hydrostatic Sterilizers, Gebr. Stork & Co. Apparatenfabriek N.V., Amsterdam, Holland.

Primary Examiner—Ronald C. Capossela
Attorney, Agent, or Firm—Banner, Birch, McKie and Beckett

[57] ABSTRACT

A method and apparatus for the conduct of a continuous process in which commodities packed in light weight containers receive thermal treatment, such as sterilization or cooking, and are thereafter cooled in a hydrostatic cooling tower. The cooling tower is divided into a plurality of sections in each of which apparatus is provided for the independent control of fluid pressure and fluid temperature therein. The containers are conducted through the system by means of a conveyor that is arranged in each cooling tower section for the vertical displacement of the conveyor course through the sections, whereby the cooling ramp of the respective containers can be effectively regulated.

20 Claims, 8 Drawing Sheets

FIG. 11

FLEXIBLE HYDROSTATIC COOLING TOWER FOR CONTINUOUS COOKER

BACKGROUND OF THE INVENTION

The present invention relates to systems for the thermal processing of commodities, such as foodstuffs or pharmaceutical products. The invention particularly involves the thermal processing of such items packed in containers formed of material that is light in weight and/or of reduced wall thickness wherein the process can be conducted on a continuous basis and in which cooling is effected in a hydrostatic water column.

It is well known that the amount of labor required for implementing thermal processing of commodities in an effectively controlled manner can be reduced through the use of continuously operated, high capacity sterilizers (termed "cookers" herein) having a hydrostatic cooling tower positioned downstream and through each of which, containers being processed are conducted via a continuous conveyor. However, notwithstanding their desirability, systems of this type have heretofore had limited application, essentially to only products packed in containers, such as glass or metal containers having sufficient container wall strength in order to withstand the maximum external pressures imposed by the system. In these systems, the containers are conducted through a multitude of sterilization and cooling towers or legs in which pressure control is provided by air overpressure. As a result of such measures, the containers are caused to experience stepped pressure changes in travelling through the respective cooling towers or legs whereby the containers are subjected to a plurality of levels of essentially constant pressure.

Experience has shown that light-weight containers, as for example those catagorized as "thin-walled" or "semi-rigid" plastic containers are unsuitable for processing in thermal systems of the described type due to the fact that such containers are highly deformable and normally require overpressure during cooking and pressure control during cooling in order to compensate for lack of container strength and the inability to withstand significant internal and external pressure differentials during processing. In the processing of such containers a more gradual pressure ramp is required that heretofore has only been achievable in batch retorts which preclude the processing of containers on a continuous basis.

It is to the amelioration of this problem, therefore, to which the present invention is directed.

SUMMARY OF THE INVENTION

It is a principle object of the invention to provide a continuous thermal processing system incorporating a hydrostatic cooling tower and in which thin-walled, light-weight containers can be effectively processed.

It is a further object of the invention to provide a continuous thermal processing system wherein, in order to accommodate products and/or containers requiring different processing conditions, both the temperature and the pressure conditions in the cooling tower can be controllably varied.

Thus, according to an aspect of the invention, there is provided a method of cooling products contained in an elongated liquid column comprising the steps of dividing said liquid column into a plurality of fluidly interconnected sections; controlling the temperature of said liquid in each of said sections; conducting said containers along courses through each of said sections; and vertically adjusting the course along which said containers are conducted within at least one of said sections to regulate the pressurized cooling ramp experienced by said containers.

In the practice of the method, a vertically elongated liquid column is divided by partition means into a plurality of vertically spaced, interconnected, liquid-bearing sections through which the containers are conducted by appropriate conveyor apparatus along a continuous course sequentially through the sections from the bottom of the liquid column to the top thereof. The conveyor apparatus for conducting the containers through the respective sections is advantageously directed along a path of travel that can be vertically adjusted in order to vary the fluid pressure to which the containers are subjected in each column section. Such path of travel is ideally provided by a continuous conveyor of the belt- or chain-type having pulleys or sprockets arranged to conduct a chain or other conveying medium along a vertically disposed, substantially triangular course in which the pulley or sprocket forming the apex of the triangle is selectively movable in an up or down direction for vertically altering the course of the containers through each section and thereby varying the hydrostatic pressure to which the containers carried by the conveyor are subjected.

The invention further contemplates adjusting the cooling rate to which the containers are subjected in each column section by selectively varying the temperature of the liquid contained therein. For this purpose, each of the column sections may be provided with a recirculating system having heat exchange means therein for adjusting the temperature of the section liquid and, concomitantly, its ability to cool the containers.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 1a is an enlarged representation of the portion of FIG. 1 identified by numeral 1a.

DETAILED DESCRIPTION OF THE PREFERRED EMBODIMENT

Figure 1:
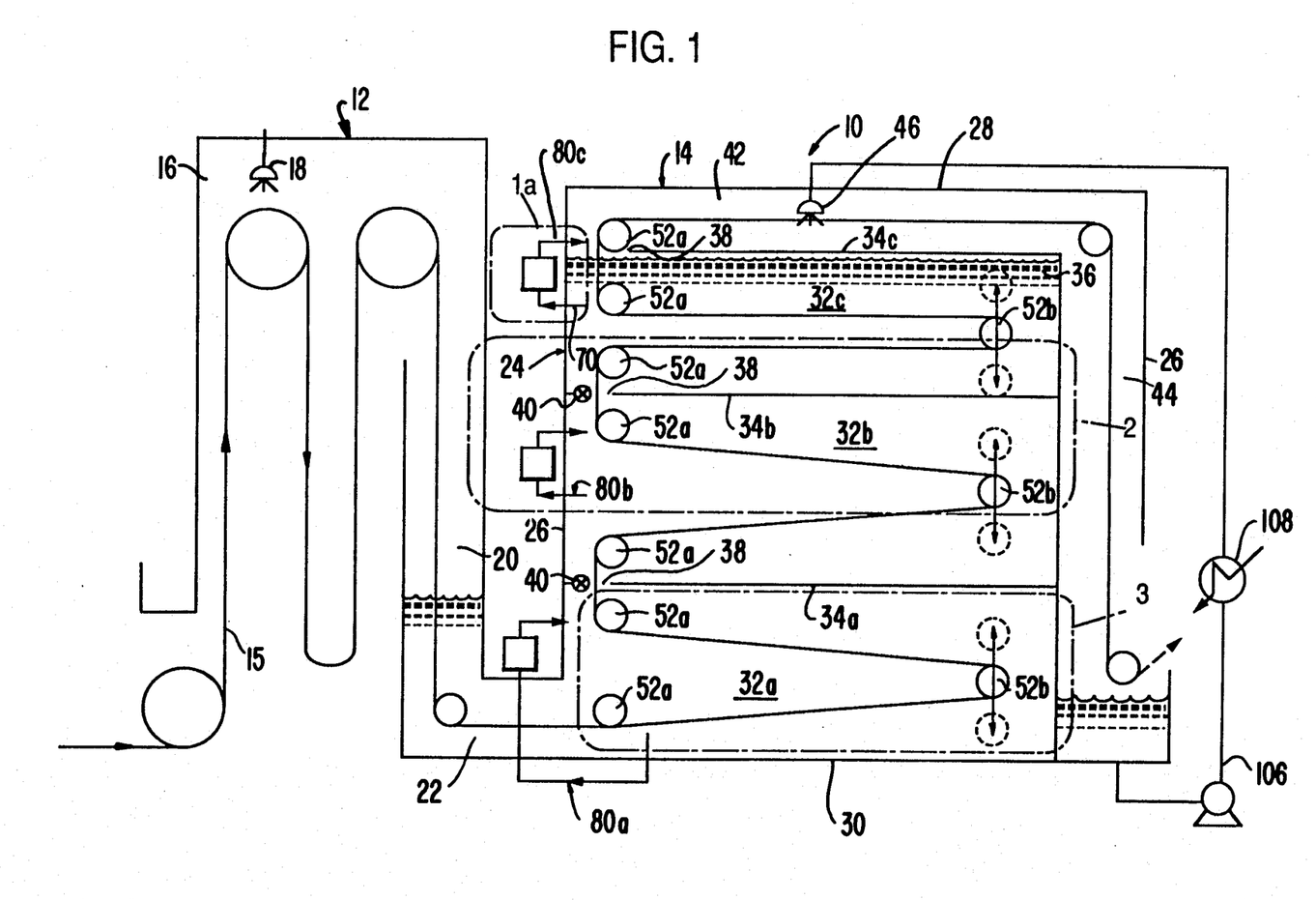
FIG. 1 is a schematic representation of a thermal processing system employing an adjustable hydrostatic cooling tower according to the present invention.
Figure 1A:
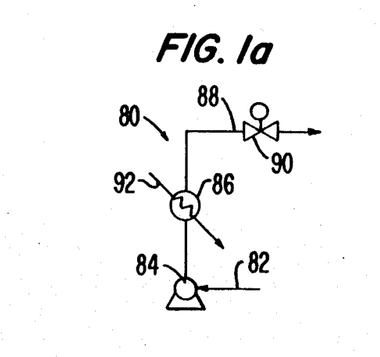

FIG. 1 shows a thermal processing system 10 according to the present invention that, in general, comprises a steam or hot water cooking or sterilizing chamber 12 and a hydrostatic cooling tower 14, through both of which a continuous processing conveyor 15 is conducted. The cooking or sterilizing chamber 12 is of well known construction and includes a heating compartment 16 into which steam or a hot water spray with overpressure air is supplied, as for example, via a spray head 18. A discharge leg 20 defines the cooking chamber outlet and connects with the bottom end of the cooling tower 14 via connecting passage 22.

The cooling tower 14 is formed of an elongated upstanding shell 24 defined essentially by rectangularly disposed walls 26 whose upper and lower ends are closed by a roof 28 and bottom 30, respectively. The interior of the shell 24 is divided into a plurality of vertically spaced sections 32a, 32b and 32c by means of mutually spaced, substantially horizontal partition plates 34a, 34b and 34c. Although the described arrangement is divided into three sections 32, it should be appreciated that a greater or lesser number of sections can be provided within the scope of the invention.

The cooling tower 14 contains a body of cooling liquid 36, typically water, which occupies substantially all of the sections 32, the respective sections being interconnected via openings 38 formed in each of the partition plates 34. Preferably, rotary valves 40 of conventional design may be provided in each opening 38 in order to retard the flow of liquid between sections, thereby tending to thermally isolate the respective sections. The region above the uppermost partition plate 34c is disposed above the liquid body 36 and defines a final cooling passage 42 that communicates with a discharge leg 44 from the tower. The final cooling passage 42 and discharge leg 44 are maintained under ambient conditions with provisions being made for the injection of atmospheric cooling liquid, here indicated by the nozzle 46.

While the conveyor 15 may be of essentially conventional design adapted for conducting rows of containers through the system according to the invention, means are provided to controllably vary the external pressure to which the containers are subjected in moving through the cooling tower 14. Thus, the conveyor 15 is preferably of the chain and sprocket-type having transverse carrier bars 48 (FIG. 7) suitably disposed between parallel chains for carrying rows of containers 50 along a continuous course through the cooking chamber 12 and the cooling tower 14. In the described organization the sprockets 52 of the conveyor 15 are arranged to define an essentially triangular course through each of the tower sections 32a, 32b and 32c. Those sprockets indicated as 52a are positioned on the side of each section 32 adjacent the interconnecting openings 48 and are rotatable in stationary or fixed mounts. The sprockets 52b at the other side of each section 32 are arranged for selective vertical movement in an up and down direction as indicated by the dash-line circles and arrows shown in the respective drawing figures. Conveniently, the movable sprockets 52b can be unitary sprockets which define the apices of the respective triangular courses. It should be appreciated, however, that other organizations of movable sprockets can be effectively utilized. For example, the length of the triangular courses of the conveyors in the respective sections, as well as the extent of movement of the respective movable sprockets 52b therein, need not be uniform. Instead, these parameters can be designed to accommodate a particular product or range of products in the system.

Figure 3:
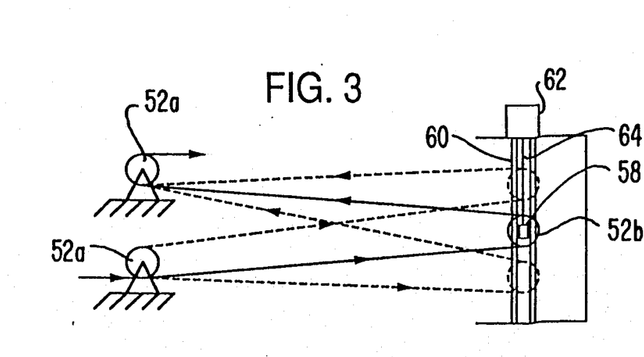
FIG. 3 is a more detailed representation of the conveyor organization in the cooling tower.
Figure 4:
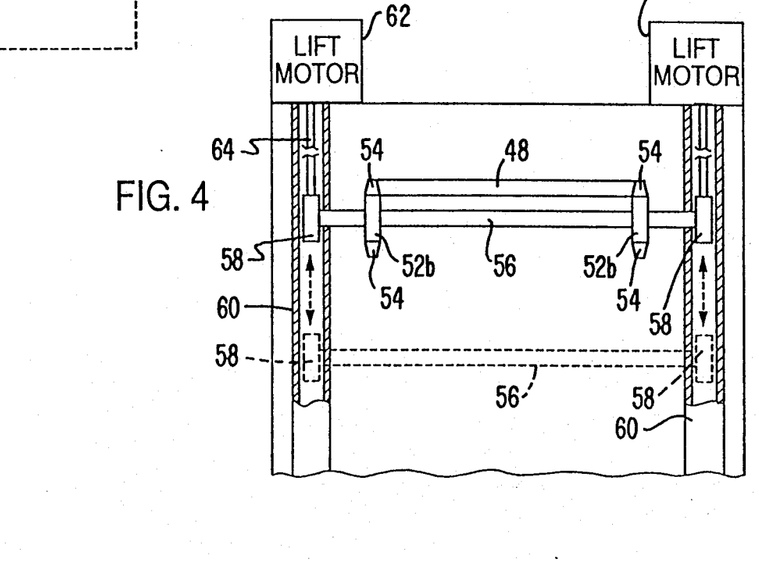
FIG. 4 is a schematic end view of a carrier bar lift assembly shown in FIG. 3.

FIGS. 3 and 4 illustrate schematically a simple organization of movable sprockets 52b suitable for practice of the invention. In this organization the sprockets 52b, which are driven by parallel chains 54, are mounted for rotation on an axle 56. The axle 56 contains at each opposite end a block bearing 58 that is adapted to undergo vertical sliding movement, as represented by the arrows in FIG. 4, within a guide structure 60. The block bearings 58 are adapted to be selectively moved in unison by lift motors 62 that connect to the respective block bearings 58 by means of connecting rods or cables 64, or the like, which are capable of controllably raising or lowering the paired sprockets 52b, as hereinafter described. (It should be appreciated that, barring the use of means for adjusting chain length, the guide structure will be formed as a large radius arcuate curve in order to maintain the tension in the respective chains 54 substantially constant).

Figure 6:
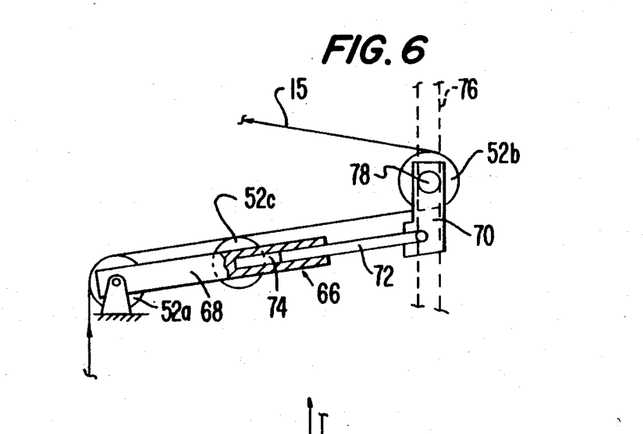
FIG. 6 is a schematic side elevational representation of a sprocket adjustment mechanism alternative to that shown in FIG. 3.
Figure 7:
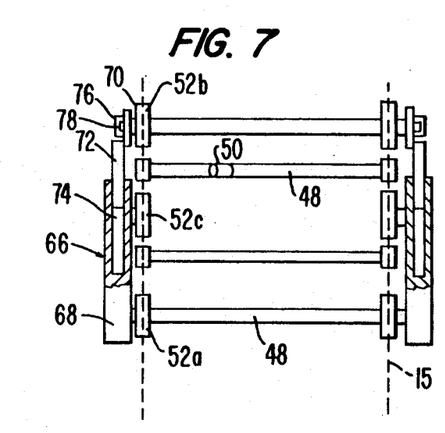
FIG. 7 is a schematic top view of the sprocket adjustment mechanism shown in FIG. 6.
Figure 8:
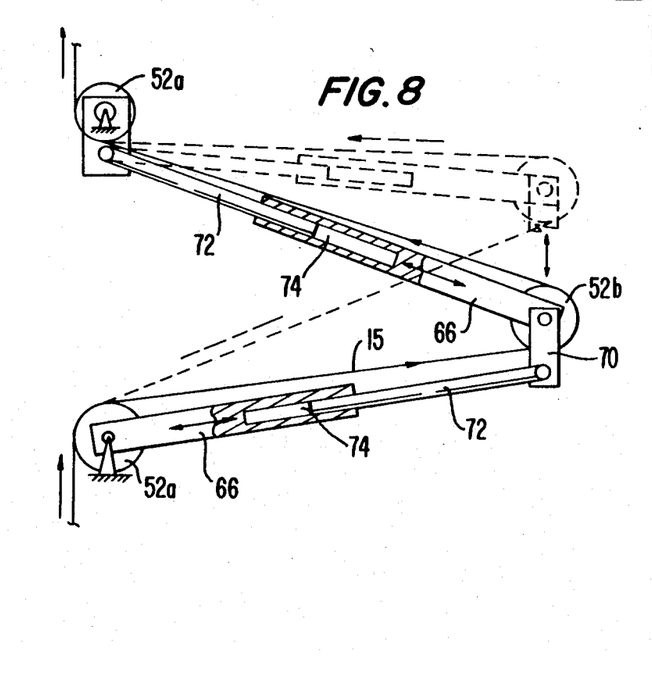
FIG. 8 is a schematic view, similar to FIG. 6, showing another alternative embodiment of the mechanism shown in FIG. 6.

Schematically represented in FIGS. 6 and 7 is an alternative form of sprocket organization in which the movable sprockets 52b are supported by structural beam devices 66 of variable length to accommodate movement of the sprocket axles 56. The devices 66 each comprise an elongated block or beam 68, here shown as mounting an idler sprocket 52c and each pivotally attached at one end to the mount of the fixed sprocket 52a. The sprocket 52b is rotatably attached to a movable bracket member 70 that is secured to the end of a pivoted rod 72 whose opposite end is slidably received in an elongated bore 74 in the beam 68. In this arrangement, the guide structure is conveniently formed by a channel 76 that slidably receives a cylindrical bearing block 78 which is fixed to the bracket member 70. The arrangement of FIG. 8 is similar to that of FIGS. 6 and 7 except that structural beams 66 extend from the movable sprocket 52b to the mounts of both of the fixed sprockets 52a.

Figure 5:
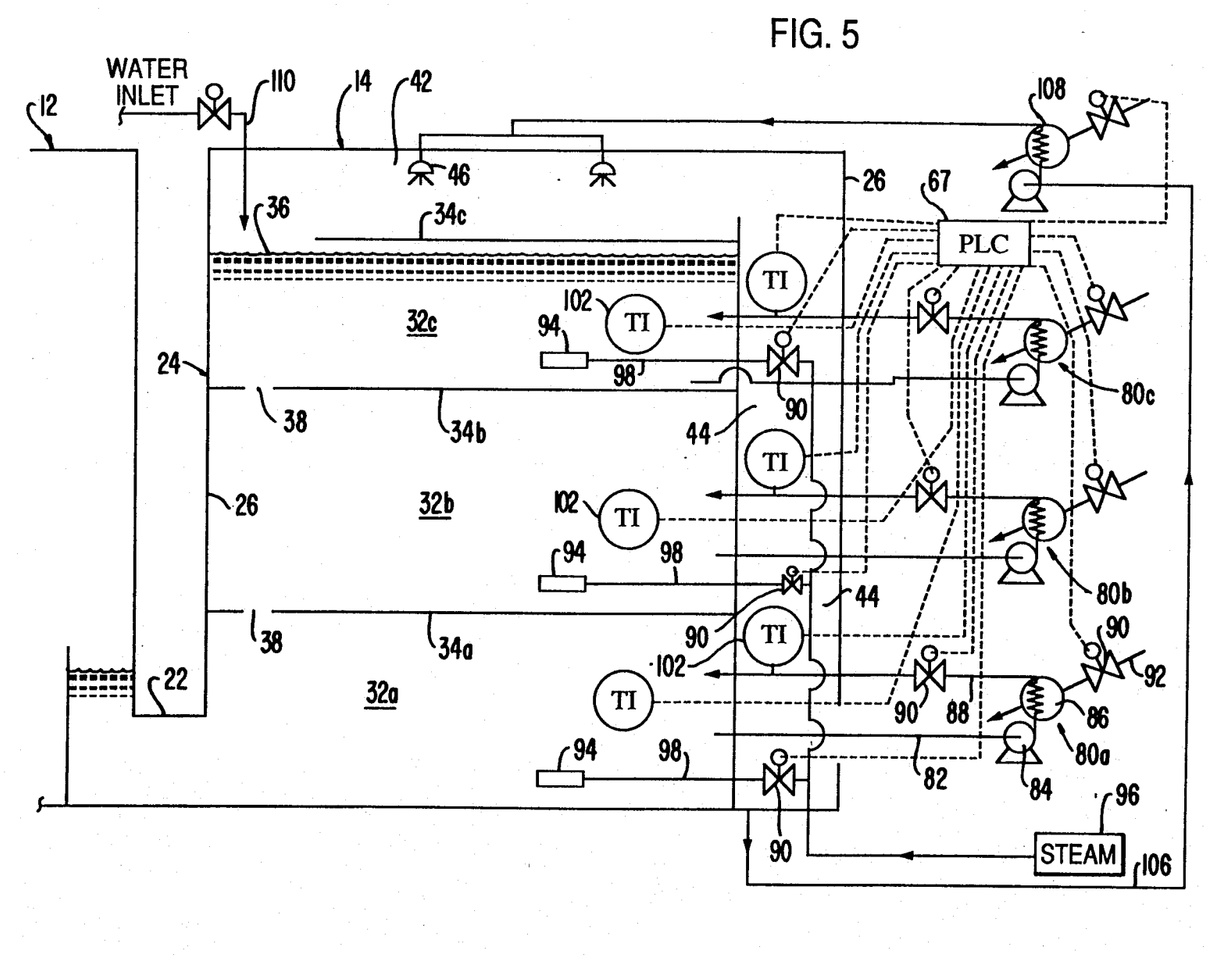
FIG. 5 is a partial, somewhat enlarged view similar to FIG. 1, showing the temperature control piping, and with the chain and sprockets omitted for the sake of clarity.

Accordingly, it will be appreciated that, to effect a variation in the external pressure imparted to containers 50 conducted on conveyor 15 through the sections 32a, 32b and 32c of the hydrostatic cooling tower 14, the lift motors 62 are actuated by a controller, such as the programmable logic controller 67 shown in FIG. 5, to either raise the movable sprocket 52b or to lower it, depending upon whether there is a desire to reduce the external pressure imparted upon the containers 50 in the respective cooling tower sections 32. Obviously, a lowering of the movable sprocket 52b in the respective sections will result in an increase in the resultant external pressure to which the containers are subjected in each respective section. Alternatively, to reduce the resultant external pressures imposed upon the containers, the controller 67 operates to raise the concerned movable sprocket 52b.

It is apparent that the sensitivity of this pressure control function will vary in accordance with the number to sections 32 existent in a cooling tower, with the sensitivity being proportionately enhanced as the number of tower sections are increased and, conversely, the sensitivity being proportionately reduced with a reduction in the number of tower sections.

The invention additionally contemplates means for independently controlling the rate of cooling the containers in the respective cooling tower sections 32. This feature is indicated generally by the cooling liquid recirculating systems 80a, 80b and 80c associated with the respective sections 32, each of which comprises, on the primary side, an extraction line 82, a circulation pump 84, a heat exchanger 86 and a supply line 88 containing a control valve 90. On the secondary side, the systems 80 comprise a heat transfer fluid line 92 containing control valve 90 for transferring heat to or from the primary coolant depending upon the temperature of the heat transfer fluid passed through the line 92.

Figure 2:
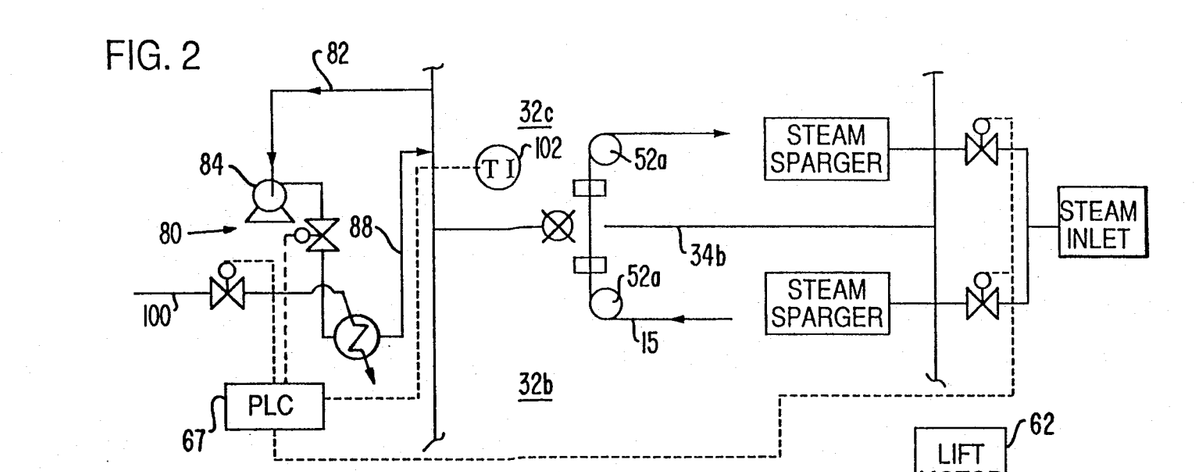
FIG. 2 is an enlarged representation of the portion of FIG. 1 identified by numeral 2.

Having a cumulative effect on temperature in each cooling tower section 32 is the presence of a steam sparger 94 for injecting steam from a source 96 through lines 98 containing control valves 90 into the body of cooling liquid occupying each section. Moreover, as shown in FIG. 2, it is also possible to add a further element of control by the introduction of additional cooling liquid via inlet line 100 in amounts regulated by appropriate control valves.

It will be appreciated that, in the described system, temperature control of the various system elements is effected by operation of the controller 67 in response to feedback signals generated by temperature sensors 102 disposed on the supply lines 88 of the circulating system, as well as in the interior of the cooling tower for measuring the temperature of the liquid body in each respective section 32. This latter function is effective to maintain the temperature of the liquid body in each section 32 at a selected level depending upon several factors including the particular contents of the containers being processed, the physical characteristics of the containers, the rate of conveyance of the containers through the system, and the temperature within the cooker 12 and, particularly, its discharge leg 20, as well as the temperature in the upstream sections 32.

As shown in FIG. 5, it is generally desired that the temperature of the processed containers 50 conducted by the conveyor 15 along the final cooling passage 42 be reduced to about ambient or atmospheric temperature. Thus, the system preferably will employ coolant sprays 46 operative to impart to the passage 42 recirculated cooling liquid from the cooling tower discharge leg 44 through line 106 and controllably cooled in a heat exchanger 108 in response to system conditions, as determined by the controller 67. As further shown in FIG. 5, the hydrostatic head of the body of cooling liquid 36 can be adjusted by the controlled introduction of liquid through the supply line 110.

Figure 9:
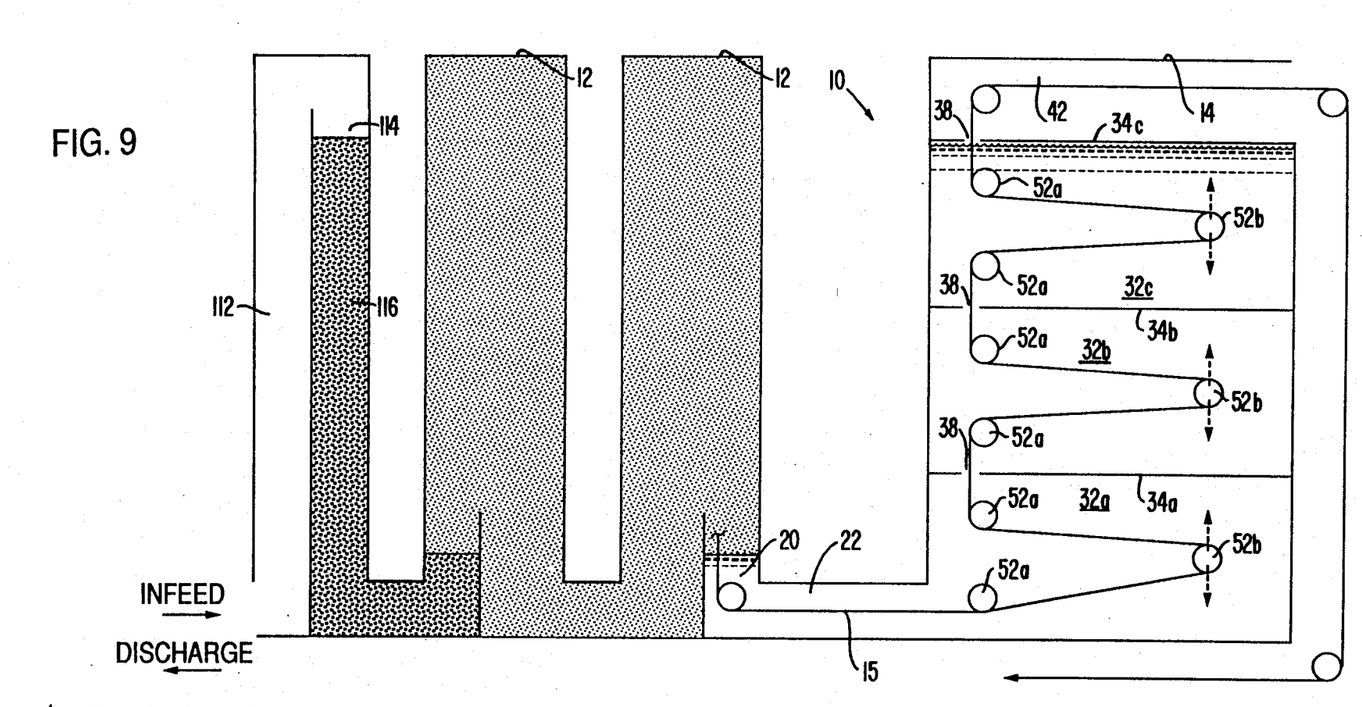
FIG. 9 is a stylized schematic elevational view of a thermal processing system using the adjustable cooling tower of the present invention and known infeed and cooking towers.
Figure 10:
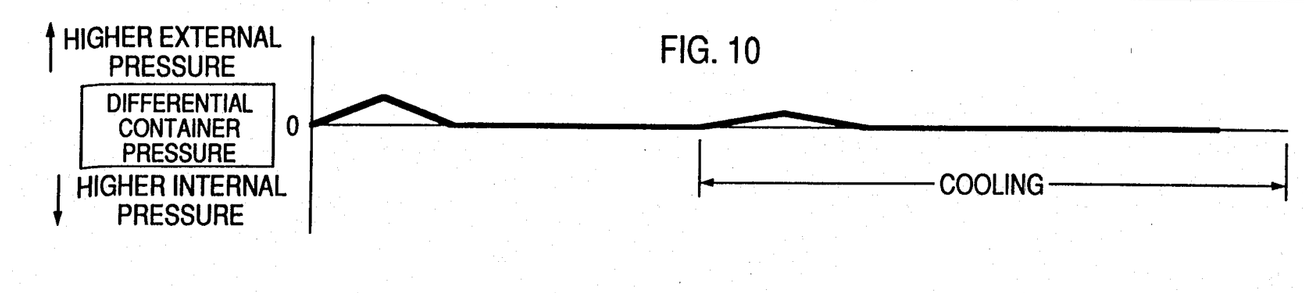
FIG. 10 is a pressure deviation profile for a representative container conducted through the system of FIG. 9.

FIGS. 9 and 10 of the drawings illustrate the differential pressure changes occurring in containers 50 as they are conducted through a typical processing system, such as that shown in FIG. 1, but wherein a more complete representation of the cooker 12 is shown including the infeed leg 112 and a preheat leg 114 upstream of the operating cooking or sterilizing section as depicted in FIG. 1. As shown, as the containers are conducted through the infeed leg 112 the external pressure imposed thereon as they move through the liquid sealing column 116 exceeds that generated within the containers by an amount that can be readily accommodated by the containers. Thereafter, as the containers 50 are caused to course through the actual cooking chambers 12 (two modular cooking chambers being shown in FIG. 9), the internal pressures generated by the addition of heat to the container contents is controllably offset by the addition of air overpressure in the cooker sections. Thus, as shown by the graph of FIG. 10, the differential pressure realized by the containers 50 can be effectively maintained at zero throughout substantially its entire course through the cooker system.

Similarly, except for that period during which the containers traverse the connecting passage 22 between the cooker discharge leg 20 and the lowermost section 32a of the cooling tower 14, the differential pressures realized by the containers 50 in traversing the cooling tower sections 32a, 32b and 32c can be maintained at substantially zero by practice of the invention. Coincident with maintaining the differential pressures at zero, the described system, by the presence of the cooperating recirculating systems 80a, 80b and 80c (FIG. 5), introduces to the system an element of temperature control that insures the discharge of containers at ambient temperatures from the system.

Figure 11:
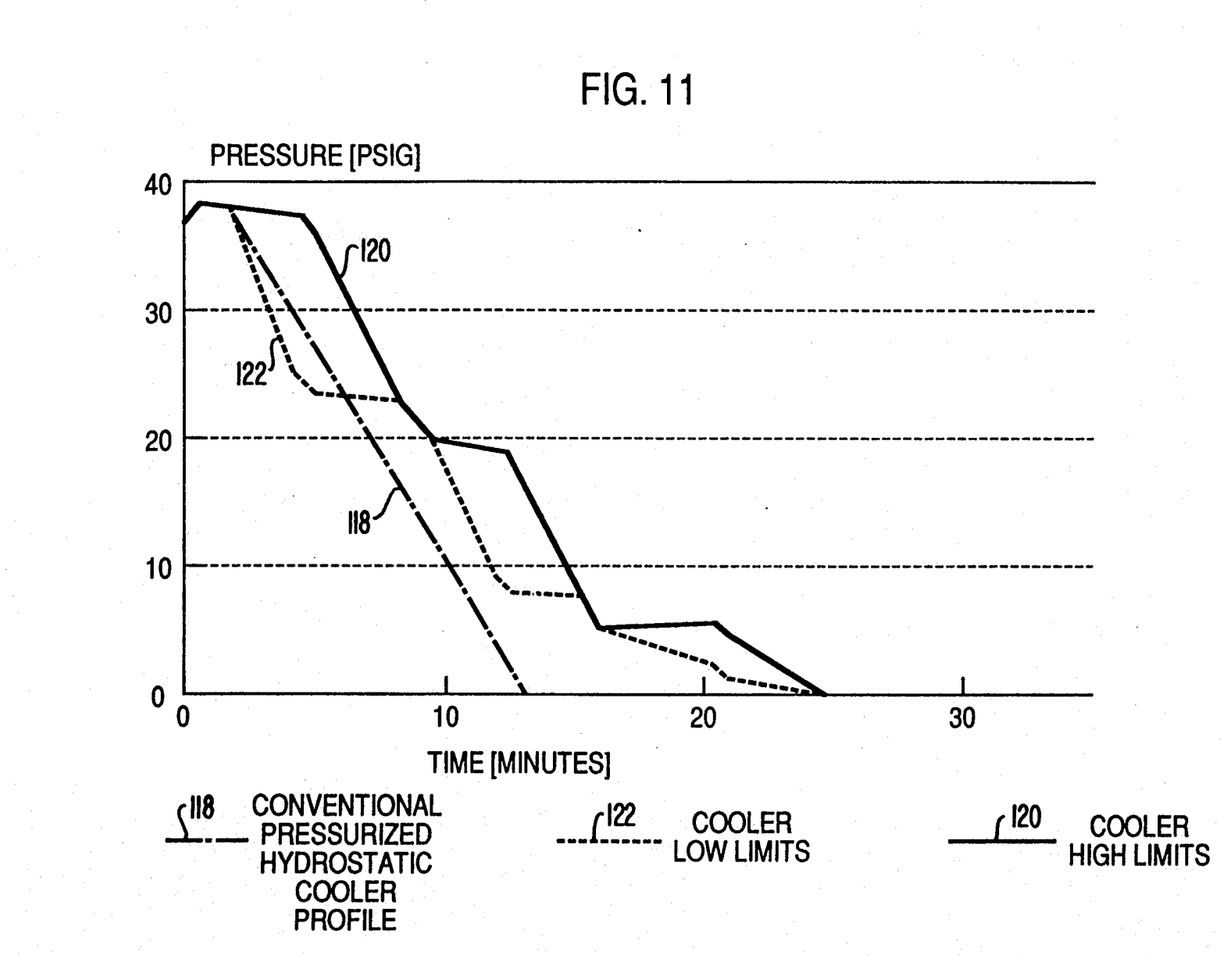
FIG. 11 is a pressure graph through the cooling tower of FIG. 1 illustrating both the high and low adjustment limits thereof, and a comparison with the effects produced in a conventional pressurized hydrostatic cooling tower of the prior art.
Figure 12:
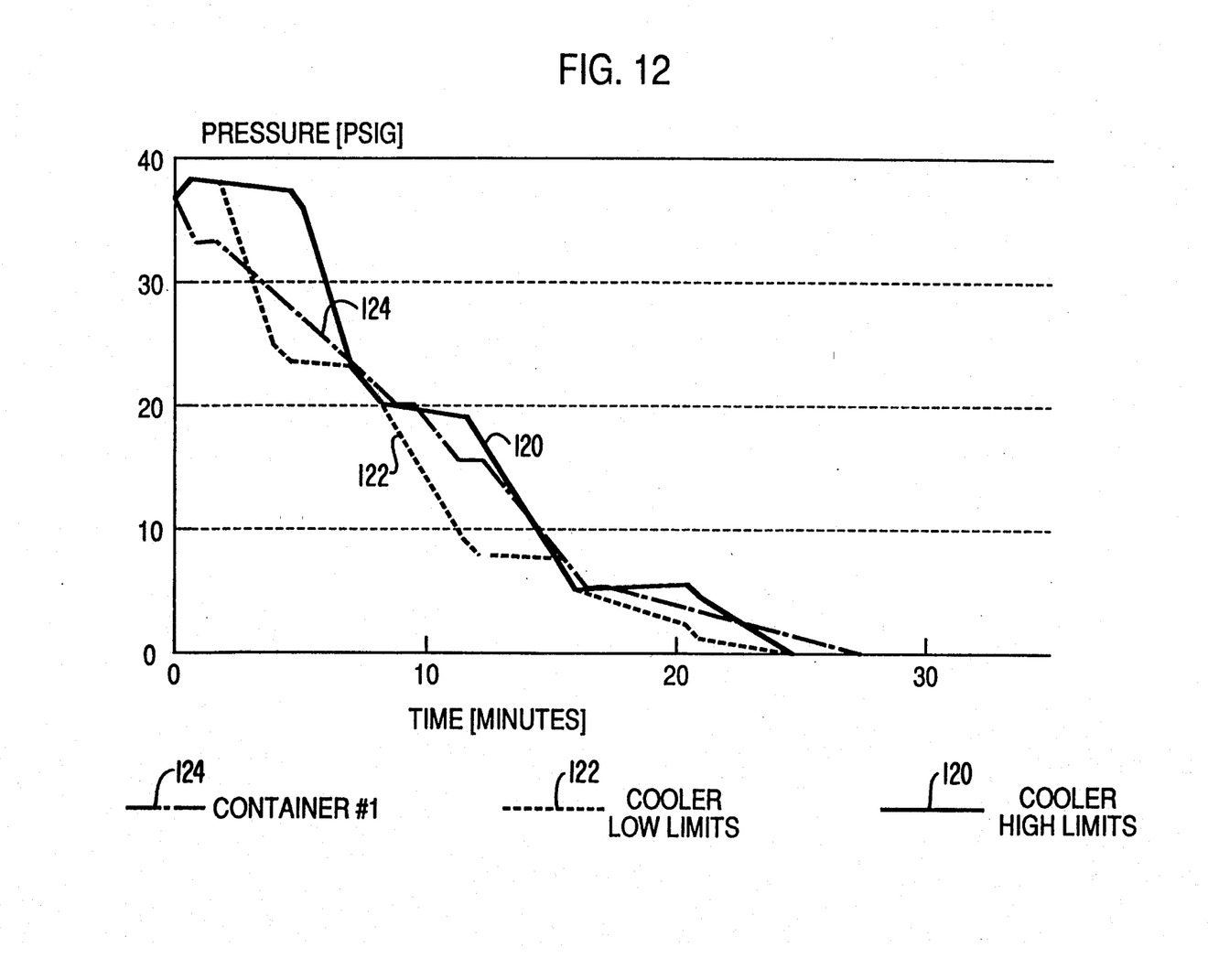
FIG. 12 is a pressure graph similar to that of FIG. 11 comparing the anticipated pressure on a first known container in a conventional cooling tower with that in the cooling tower of the present invention.
Figure 13:
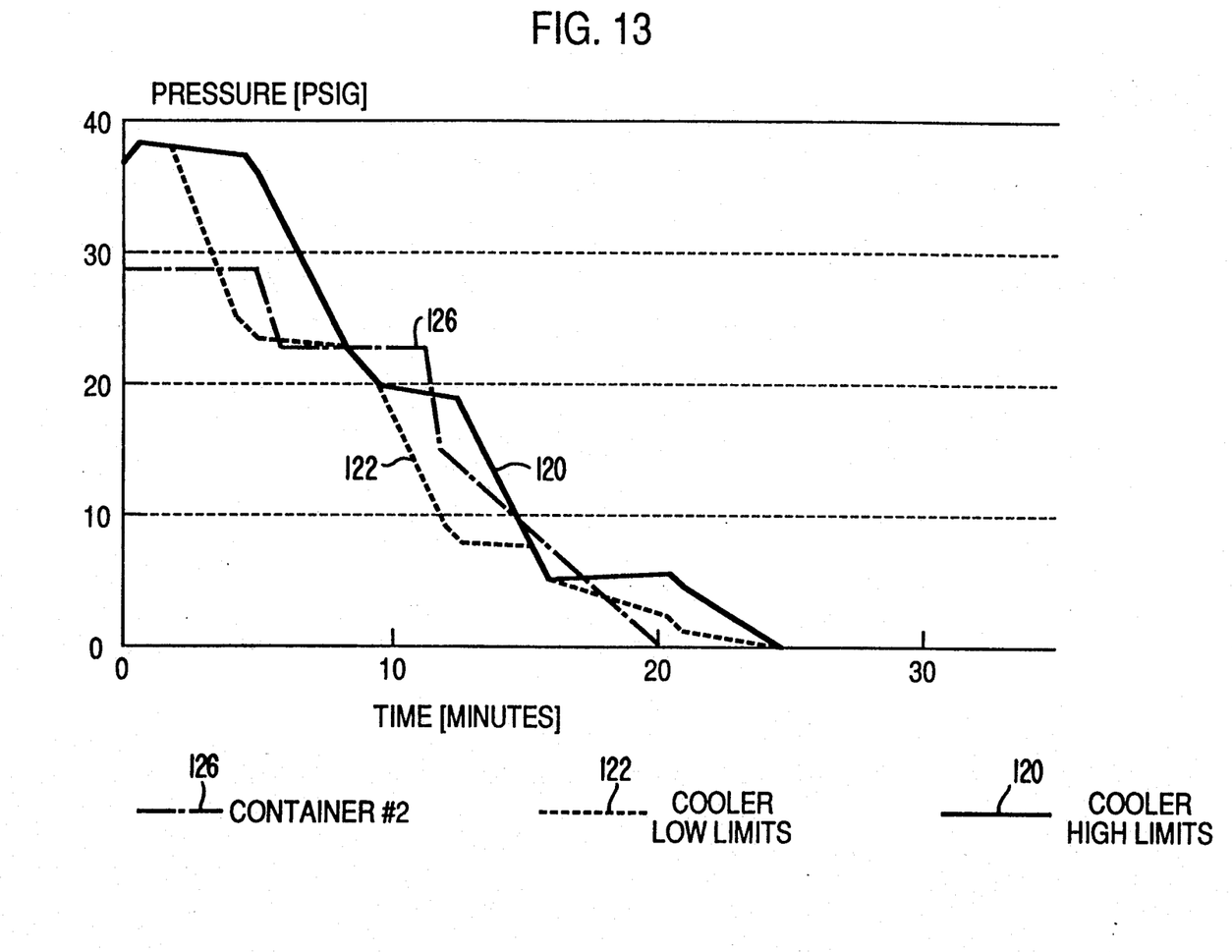
FIG. 13 is a pressure graph similar to FIG. 12 comparing the anticipated pressure on a second known container in a conventional cooling tower with that in the cooling tower of the present invention.

FIGS. 11 to 13 graphically illustrate the benefits derived from the invention. As shown in FIG. 11, the pressure ramping of product that occurs in a conventional hydrostatic cooling tower in which the product moves along a vertical course is shown by the line 118 as being an invariable or constant ramp. Conversely however, as depicted by lines 120 and 122 that represent the upper and lower pressure limits, respectively, which can be imposed on the containers 50 by practice of the invention, the pressures imposed on the containers in the respective cooling tower sections 32a, 32b and 32c are variable over significant controllable ranges in order that the containers can be effectively cooled without the imposition of a differential pressure across the container wall.

FIGS. 12 and 13 graphically compare the cooling characteristics of two different contained products in the cooling tower of the present invention with products cooled by a batch cooling process which heretofore had been the only effective manner of cooling thin walled containers, the first container being represented by line 124 in FIG. 12 and the second by line 126 in FIG. 13. In each instance it is apparent that, due to the ability to control, principally the effective pressures imposed on the containers in the respective cooling tower sections 32 and, secondarily, the temperature of the cooling liquid in the sections, the pressure profiles can be made to closely replicate those occurring in a batch cooling system.

From the foregoing description, it will be apparent that the hereindescribed thermal processing system of the present invention provides a hydrostatic cooling tower which, by the inclusion of separate cooling sections, each incorporating means for variably controlling both the temperatures of the cooling liquid and the pressures imposed thereby, a cooling tower organization can be incorporated in a continuously operable thermal processing system, even one adapted to process product in containers of limited strength.

It will be understood that various changes in the details, materials and arrangement of parts which have been herein described and illustrated in order to explain the nature of the invention may be made by those skilled in the art within the principle and scope of the invention as expressed in the appended claims.

I claim:

1. A method of cooling products contained in sealed containers in an elongated column of cooling liquid comprising the steps of:
    dividing said liquid column into a plurality of fluidly interconnected sections;
    controlling the fluid pressure of said liquid in said sections;
    conducting said containers along courses through the cooling liquid contain each of said sections; and
    vertically adjusting the course along which said containers are conducted within at least one of said sections to controllably alter the pressurized cooling ramp experienced by said containers.

2. The method of claim 1 in which said sections are vertically spaced and including the step of conducting said containers sequentially through said sections from the bottom of said liquid column to the top thereof.

3. The method of claim 1 including the step of conducting said containers along a continuous course through all of said sections.

4. The method of claim 1 including the step of conducting said containers along a generally triangular course through each of said sections.

5. The method of claim 4 including the step of adjusting the vertical position of an apex of said triangular course in at least one of said sections.

6. The method according to any one of claims 1 to 5 including the step of selectively varying the temperature of the cooling liquid in each of said sections.

7. The method of claim 6 in which the temperature of said cooling liquid in said sections is varied by recirculating a portion of the liquid in said sections and effecting a transfer of heat to or from said liquid portion.

8. Apparatus for cooling products contained in sealed containers comprising:
    a vertically elongated treatment chamber for containing a body of cooling liquid therein, said chamber having a container inlet adjacent the bottom thereof and a container outlet adjacent the top thereof;
    partition means dividing said chamber into a plurality of interconnected liquid-bearing sections;
    means for conducting said containers along a path of travel successively through said sections; and
    means for adjusting said path of travel in a substantially vertical direction in each of said sections.

9. The apparatus of claim 8 in which said container conducting means comprises a sprocket and chain means defining a substantially triangular travel path in each of said sections.

10. The apparatus of claim 9 in which said sprocket and chain means comprises means for varying the vertical position of at least one of said sprockets in each of said sections.

11. The apparatus of claim 10 including means for varying the vertical position of a sprocket defining the apex of said travel path.

12. The apparatus of claim 11 in which said movable sprocket includes a bracket mounting said sprocket for rotation; motor means connected to said bracket for moving said bracket in a vertical direction; and means for controlling said motor means for selectively moving said bracket.

13. The apparatus of claim 8 in which said container-conducting means extends continuously through said chamber between said container inlet and said container outlet.

14. The apparatus of claim 13 including means forming openings in said partitions for accommodating passage of said container-conducting means; and a rotary valve operable in each of said openings for restricting the passage of cooling liquid through said openings.

15. The apparatus of claim 14 in which said sprocket and chain means in each of said sections comprises sprockets disposed on vertically extending triangular spacing, including a pair of fixed vertically spaced sprockets positioned adjacent said opening and a movable sprocket in laterally spaced relation from said fixed sprockets.

16. The apparatus of claim 12 including an elongated support strut extending between said bracket and one of said fixed sprockets, and means for varying the length of said support strut in response to movement of said bracket.

17. The apparatus according to any one of claims 8 to 16 including means for recirculating a portion of the cooling liquid in said sections, said recirculating means including means for transferring heat to or from said liquid portion.

18. The apparatus according to claim 17 in which each said recirculating means includes a recirculating line having its ends in fluid communication with said liquid-bearing section, a pump for circulating liquid through said recirculating line, and heat exchange means in said line for controllably changing the temperature of the liquid circulated through said recirculating line.

19. The apparatus according to claim 18 including means for controlling the flow of coolant through said heat exchanger.

20. The apparatus according to claim 19 including means for sparging steam to said liquid-bearing sections, valve means for cooperatively controlling the flow of coolant through said heat exchanger and steam to said sections in response to the temperature of the liquid in said liquid-bearing section.

* * * * *